United States Patent [19]
McMillen

[11] Patent Number: 5,884,464
[45] Date of Patent: *Mar. 23, 1999

[54] NARROW ROW CORN HEAD WITH STAGGERED HEIGHT ROW UNITS

[75] Inventor: Richard E. McMillen, Sherrard, Ill.

[73] Assignee: Case Corporation, Racine, Wis.

[ * ] Notice: The term of this patent shall not extend beyond the expiration date of SIR No. H1102.

[21] Appl. No.: 766,163

[22] Filed: Dec. 12, 1996

[51] Int. Cl.⁶ .......................... A01D 45/02; A01D 57/22
[52] U.S. Cl. ..................................... 56/98; 56/111; 56/119
[58] Field of Search .................................. 56/98, 59, 66, 56/69, 75, 78, 82, 88, 93, 106, 108, 111, 119

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,528,233 | 9/1970 | Martner et al. . |
| 3,528,234 | 9/1970 | Kowalik et al. . |
| 3,585,789 | 6/1971 | Blanshine et al. ......................... 56/98 |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. ............................ 56/98 |
| 4,227,368 | 10/1980 | Mossman et al. . |
| 4,259,831 | 4/1981 | Jerke et al. ................................. 56/93 |
| 4,269,017 | 5/1981 | deBuhr et al. . |
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,528,887 | 6/1996 | Nagy et al. . |

OTHER PUBLICATIONS

*Farm Show*, vol. 20, No. 5, 1996 —"Build–It–Yourself" Narrow Row Header Kit.
1000 Series Corn Head, Operators Manual, 1995 Case Corporation.
1000 Series Corn Head, Parts Catalog, 1993 Case Corporation.
*Farm Industry News*, vol. 29, No. 11, 1996 —"Does Narrow Row Corn Add Up?".
*Ontario Farmer*, vol. 29, No. 40, 1996 —"Thinking 15–Inch".
Allis–Chalmers Tractor Division–Milwaukee, U.S.A., "1918–1960, An Informal History", Copyright 1989 by Alan C. King.

(List continued on next page.)

*Primary Examiner*—Terry Lee Melius
*Attorney, Agent, or Firm*—Foley & Lardner

[57] ABSTRACT

An improved row crop header for harvesting crops planted in rows. The improved row crop header has a plurality of row units mounted on a frame such that the adjacent gatherers of two adjacent row units are in offset planes to permit the overlap of the adjacent gatherers. This overlap permits the row units to be arranged closer together on the frame allowing the row crop header to harvest narrower crop rows than existing corn heads. Also provided is a method that uses the improved row crop header to harvest narrower crop rows than in the past.

15 Claims, 4 Drawing Sheets

OTHER PUBLICATIONS

Operators Manual, Setting Up Instructions, "McCormick 34HM–21 Corn Snapper (Two Row, Mounted Type)", International Harvester Company (Date Unknown).

Instruction Manual and Parts List, "Snapping Unit Frame Field Improvement Parts for McCormick–Deering, No. 14P, No. 24, Corn Pickers", International Harvester Company (Date Unknown).

CP–8 McCormick Parts Catalog, "34HM–20 Corn Picker, 34HM–21 Corn Snapper, 34HM–22 Sweet Corn Picker (Two–Row, Mounted–Type)", International Harvester Company (Date Unknown).

NARROW ROW CORN HEAD WITH STAGGERED HEIGHT ROW UNITS

FIELD OF THE INVENTION

This invention relates to a row crop harvesting machine. More particularly, this invention relates to a header for a row crop harvesting machine that is designed to harvest crops, such as corn, planted in rows spaced closer together than in the past.

BACKGROUND OF THE INVENTION

Several variations of header units have been used in combines or harvesting machines for harvesting row crops such as corn and cotton. One of the first such header units was a corn head with fixed spacing between the row units. Several other corn heads allowing variable spacing between the row units were then developed.

With the advent of the variable row width header units, the last several years has seen a rapid increase in the research and development of the effect of varying row widths on the growth of corn and other row crops. The existing corn heads and harvesting machines are designed to efficiently harvest corn planted in rows having a row width of greater than 20 inches, because the existing corn heads have the gatherers of their row units in the same plane, thereby limiting how close the row units can be arranged together.

For example, a typical existing corn head with a plurality of row units has both the gatherers of each row unit arranged in the same plane. Thus, the adjacent gatherers of any two adjacent row units are also arranged in the same plane. This limits how close the adjacent row units can be positioned as the adjacent gatherers of the adjacent row units can interfere with each other if the adjacent row units are arranged too close to each other. As the technology to build the chains and other row unit components limits the minimum width of a row unit, the positioning of adjacent row units determines the minimum crop row width that can be efficiently harvested by the existing corn heads. Thus, current technology limits the row widths to about 20 inches because the gatherers in adjacent row units of the existing corn heads can interfere with each other if they are brought any closer.

Recent research on the spacing of the corn rows has indicated special benefits for narrower row spacings that are 12–16 inches apart. In addition to the obvious increase in yield and crop population, these benefits include improved erosion control and better weed control. The narrower rows also require less chemicals and pesticides per unit of yield thereby benefitting the environment.

Existing header units are not designed to harvest rows having a spacing of 16 inches or less. Consequently, they are very wasteful and inefficient in harvesting narrow rows leading to a sub-optimal harvesting efficiency.

The problems identified above are not intended to be exhaustive but are among the many that reduce the effectiveness of current solutions to the problem of harvesting crops planted in narrow rows. Other problems may also exist; however, those presented above should be sufficient to demonstrate that currently known solutions are amenable to worthwhile improvement.

SUMMARY OF THE INVENTION

Accordingly, it would be desirable to provide a row crop header that alleviates the problem of harvest efficiency of narrow crop row widths by allowing efficient harvesting of narrower crop rows.

It would also be desirable to provide a row crop header having row units spaced closer together to harvest narrower rows and thereby reduce the use of fertilizers and pesticides and benefit the environment.

It would also be further desirable to provide a method of harvesting row crops using an improved row crop header that allows the harvesting of crops planted in narrower rows than currently practicable.

The present invention provides a row crop header with a plurality of row units mounted on a frame of the row crop header. The plurality of row units includes both a first row unit having at least one gatherer positioned in an upper plane, and an adjacent second row unit having at least one gatherer positioned in a lower plane. The upper plane and the lower plane are offset. This configuration allows the two adjacent row units to be positioned closer together because the adjacent gatherers overlap along an axis that is substantially parallel to both the upper plane and the lower plane. This overlap determines how close the adjacent row units are positioned together. Increasing the overlap reduces the distance between the adjacent row units.

The present invention also defines a method that provides a row crop header including both a first row unit having at least one gatherer positioned in an upper plane and an adjacent second row unit having at least one gatherer positioned in a lower plane where the upper plane and the lower plane are offset. The first row unit and second row unit are connected to the frame of the row crop header with a primary gatherer of the first row unit overlapping a secondary gatherer of the second row unit along an axis that is substantially parallel to both the upper plane and the lower plane. This overlap permits the row crop header of the present invention to efficiently harvest narrower crop rows when the row crop header is mounted on a harvesting machine.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
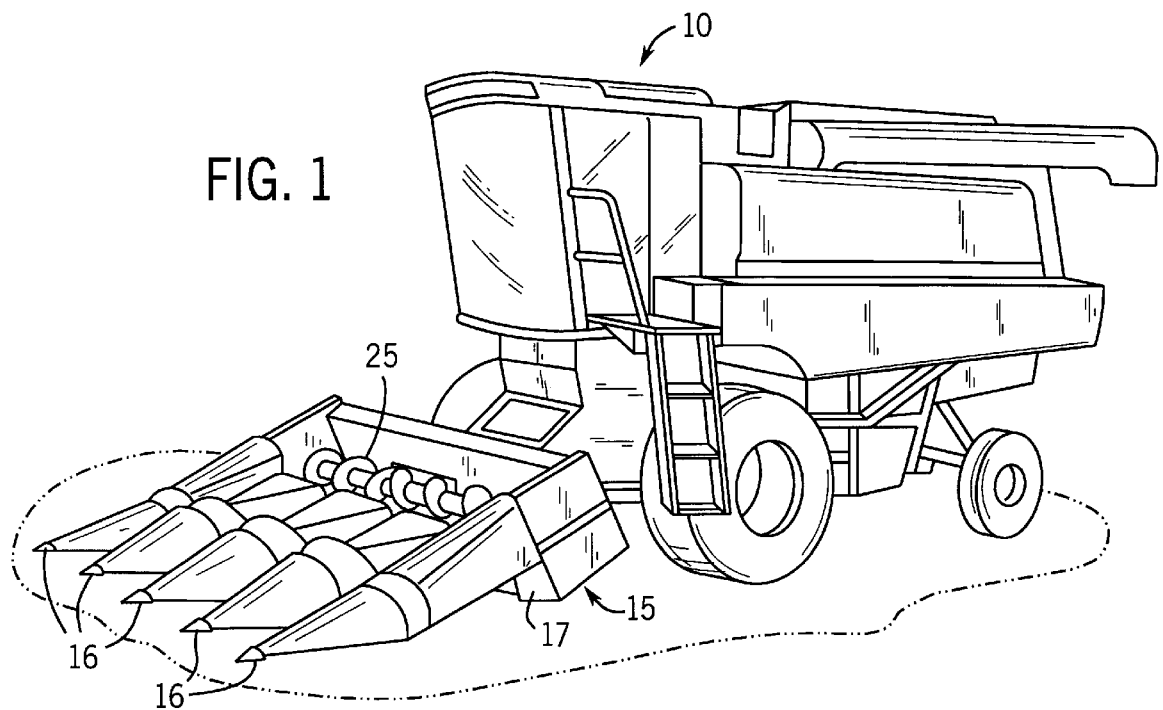
FIG. 1 is a perspective view of a harvesting machine with an attached row crop header provided by the invention.

FIG. 1 shows an improved row crop header, indicated generally as 15, connected to a combine or harvesting machine 10. The improved row crop header 15 has a unique configuration that permits the efficient harvesting of the crops planted in rows spaced closer together than in the past.

Figure 2:
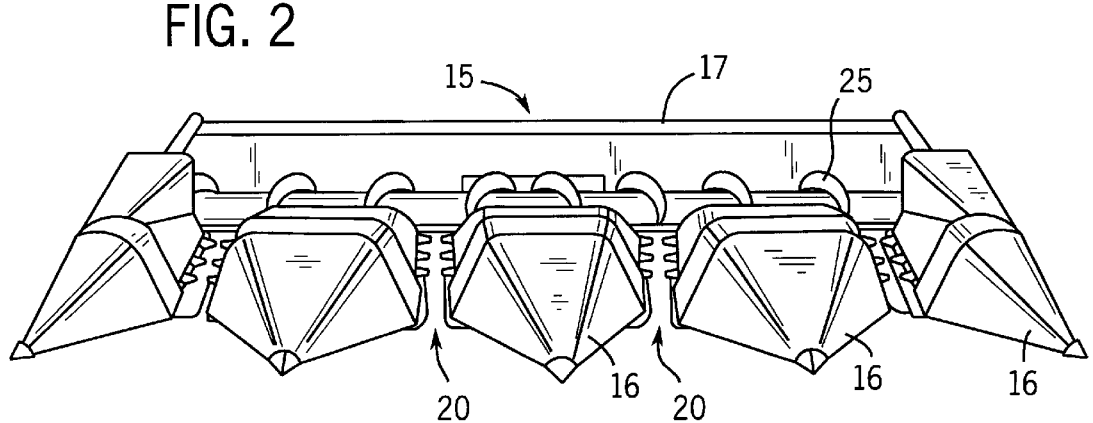
FIG. 2 is a perspective front view of the row crop header shown in FIG. 1.

FIG. 2 shows the row crop header 15 having a plurality of row units 20 connected to a frame 17 of the row crop header 15. The row units 20 are covered by a plurality of housings 16. Note that in the figures, like numerals indicate like parts.

Figure 3:
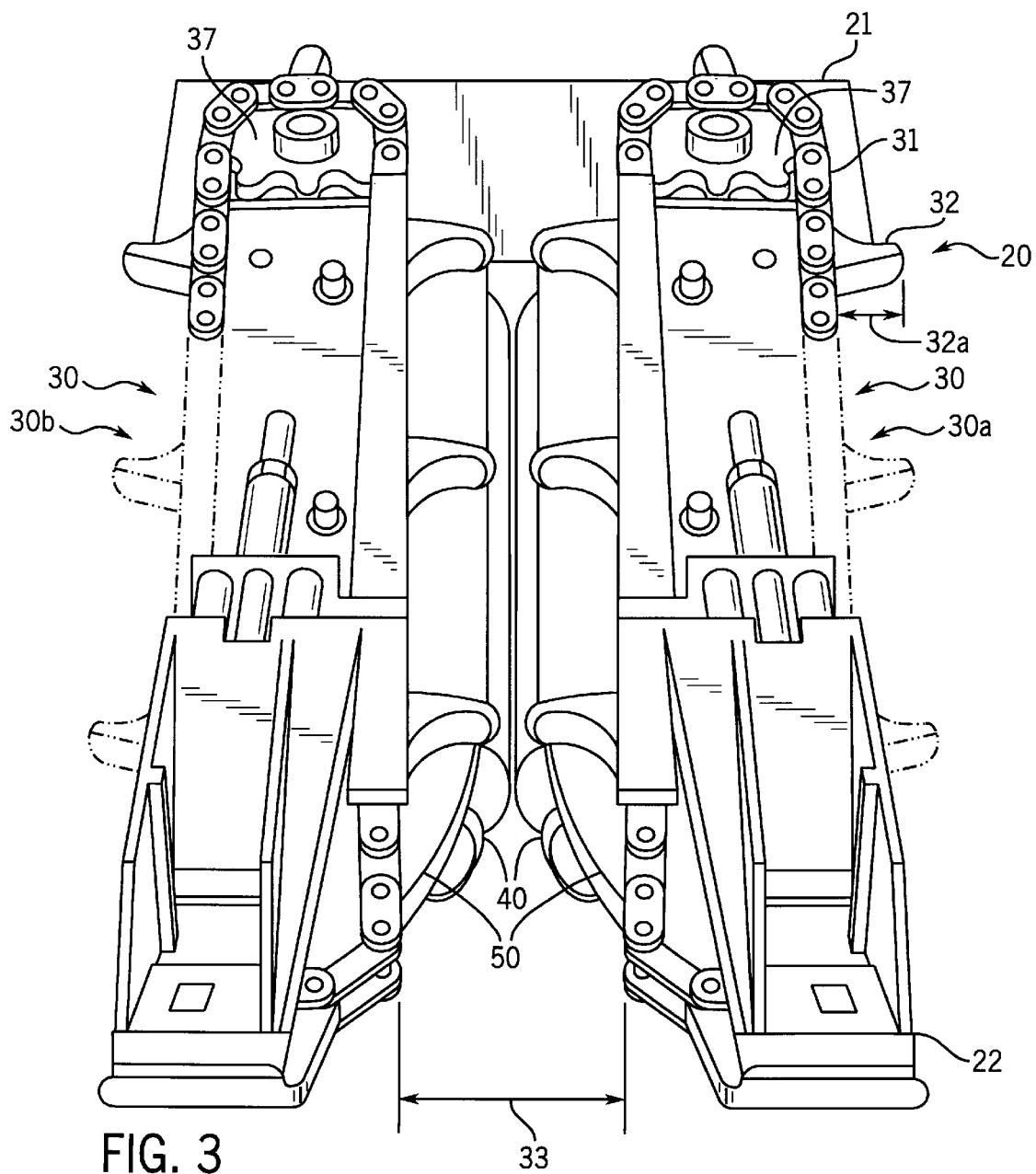
FIG. 3 is a perspective view of a row unit of the row crop header shown in FIGS. 1 and 2.

As shown in FIG. 3, each row unit 20 has a frame end 21 and a head end 22. The frame end 21 of the row unit 20 is attached to the frame 17, while the head end 22 serves as the longitudinal extension of the row unit 20 and as a crop engagement device. That is, the row unit 20 extends forward from the frame end 21 to the head end 22.

Each row unit 20 also has least one gatherer 30. The preferred embodiment of the row crop header 15 has two gatherers 30, a primary gatherer 30a and a secondary gatherer 30b. The preferred embodiment of each gatherer 30 includes a gathering chain 31 driven by at least one sprocket 37. A plurality of protruding members or fingers 32 are connected to and extend outward from the gathering chain 31. The fingers 32 are protuberances having at least one surface adapted to contact and move corn ears or other harvested crop. The gathering chain 31 traverses a substantially oval path and extends forward from proximate the frame end 21 to proximate the head end 22 of the row unit 20.

Alternative embodiments of the gatherer 30 are also possible. For example, instead of a gathering chain 31, a belt or a rope with protruding members or other similar devices adapted to move corn ears can be used.

A pair of stalk rolls 40 are also provided within the row unit 20, as shown in FIG. 3, to pull the corn stalks to remove the corn ears when the stalks come into contact with a pair of stripper plates 50. The corn ears are then carried by the fingers 32 of gathering chain 31 to a conveying mechanism, such as a cross auger 25, which is seen in FIGS. 1 & 2. The auger 25 moves the corn ears to a grain housing or collection device (not shown) of the harvesting machine 10 on which the row crop header 15 is mounted.

The stripper plates 50 can be spatially adjusted to optimize the effectiveness of the stripper plates 50 in cooperating with the stalk rolls 40 to remove corn ears from the stalks and increase harvesting efficiency.

In the preferred embodiment, shown in FIG. 3, each row unit 20 has two gathering chains 31 that are spaced apart by a distance 33 that is at least twice the width 32a of the fingers 32 of the gathering chains 31. Likewise, the minimum width of the gathering chain 31 is limited by the current technology to permit efficient operation of the row units. Thus, the spacing distance 33 and the width of the gathering chains 31 effectively limit the minimum width of the row units 20.

Figure 4:
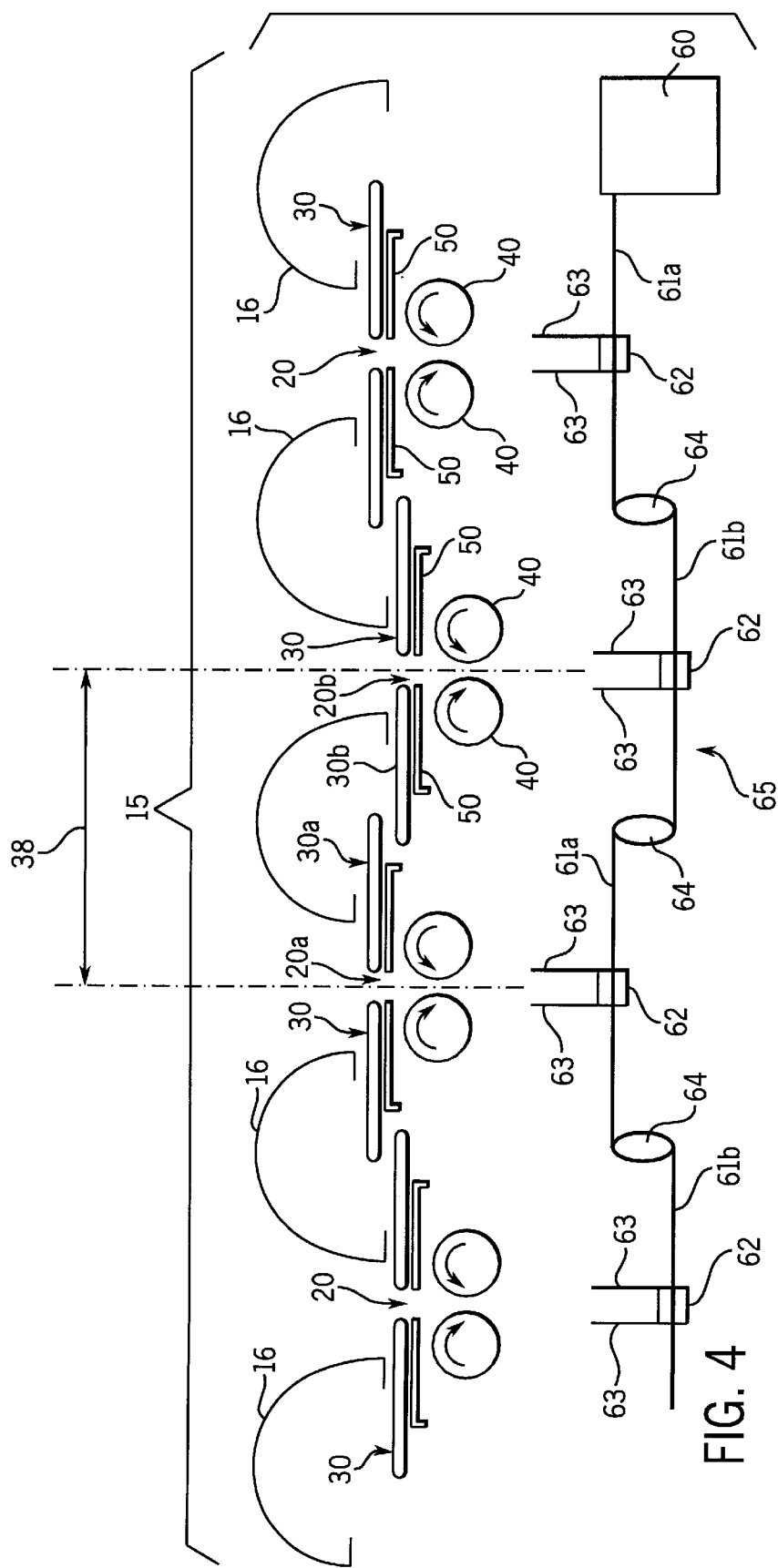
FIG. 4 is a schematic front view of the row crop header showing a plurality of row units with the gatherers of adjacent row units positioned in offset planes.
Figure 5:
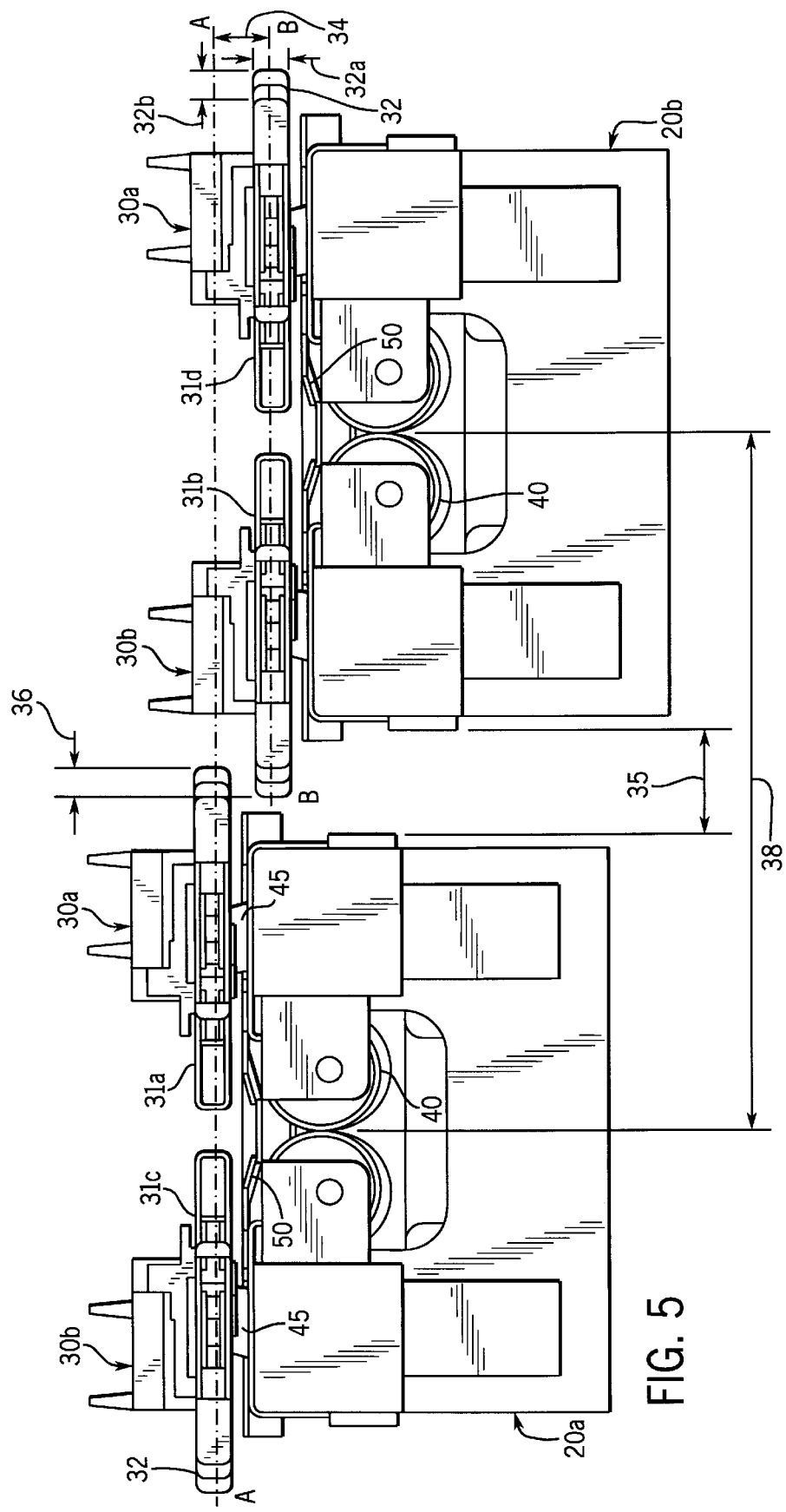
FIG. 5 is a detailed front view of one pair of the adjacent row units of the row crop header shown in FIGS. 1, 2, and 4.

FIGS. 4 & 5 show the unique configuration of the row units 20 of row crop header 15. FIG. 4 is a schematic front view of a plurality of row units 20 of the preferred embodiment of the row crop header 15. Each row unit 20 is connected to the frame of the row crop header 15 with a housing 16 covering the adjacent gatherers 30 of two adjacent row units 20. The housing 16 also serves as guides for the corn stalks as the row crop header is moved forward by the harvesting machine 10, shown in FIG. 1.

It is to be understood that "adjacent" row units refer to two row units 20, such as row unit 20a and row unit 20b, that are placed next to each other along the frame although structural members or other elements could be interposed between the two adjacent row units 20. Thus, row unit 20a is adjacent to row unit 20b as long as no other row unit 20 is positioned between them even though other structural members or elements may be interposed between them. Likewise, adjacent gatherers refer to gatherers 30 that are placed next to each other although other structural members could be interposed between them.

The gatherers 30 of each row unit 20 of the row crop header 15 are positioned in an offset plane from the gatherers 30 of the adjacent row units 20. Thus, as shown in FIG. 5, the gatherers 30 of a first row unit 20a are positioned in an upper plane AA. The gatherers 30 of a second row unit 20b, adjacent to the first row unit 20a, are positioned in a lower plane BB which is offset 34 from the upper plane AA. The offset 34 measures the separation of the two planes AA, BB.

It should be understood that the terms "upper" and "lower" are used as labels to denote the two distinct planes AA and BB which are offset. They do not necessarily imply that one plane is located higher than the other with respect to any particular reference point. In the preferred embodiment, however, plane AA is located higher than plane BB with respect to the ground surface.

In the preferred embodiment of the row crop header 15, the offset 34 always has a positive value as the two planes AA and BB are distinct and do not coincide. Also, in the preferred embodiment, the two planes AA and BB are substantially parallel to each other and the offset 34 is measured along an axis that is perpendicular to both the upper plane AA and the lower plane BB.

In the preferred embodiment of the row crop header 15, the gatherers 30 of the adjacent row units 20a, 20b are positioned in the upper plane AA and the lower plane BB, respectively. As shown in FIG. 4 this is accomplished by the row units 20a, 20b themselves being positioned in the offset planes. That is, row unit 20a is positioned in a first plane and the adjacent row unit 20b is positioned in an offset second plane that is different from the first plane. This offset relationship of the row units 20a and 20b facilitates the operation of the gatherers 30 of the first row unit 20a in the upper plane AA while the gatherers 30 of the second row unit 20b operate in the lower plane BB.

In an alternative embodiment, both the row units 20a, 20b could be positioned in the same plane and the gatherers of the adjacent row units offset on the planes AA and BB, respectively. In this alternative embodiment, the gatherers of the adjacent row units 20a, 20b would be driven by different length gatherer shafts.

The offset 34 between the two planes AA, BB can be made adjustable to optimize the effectiveness of the gatherers 30 in moving the harvested crop backward to the cross auger 25 and thereon to the grain collection device. Such an adjustment mechanism could be provided by, for example, a supporting bracket 45 with a plurality of slots (not shown) for both the gatherers 30 of a row unit 20. The gatherers 30 could be positioned in any of the slots to adjust the offset 34.

As shown in FIG. 5, two adjacent row units, the first row unit 20a and the second row unit 20b, are arranged closer together than in existing corn heads because the adjacent gatherers 30a and 30b of the two adjacent row units 20a, 20b are in the upper plane AA and the lower plane BB, respectively. That is, row unit 20a has its primary gatherer 30a positioned in the upper plane AA, while row unit 20b has its secondary gatherer 30b positioned in the lower plane BB. The upper plane AA and the lower plane BB are substantially parallel to each other and spaced by the offset 34. This offset 34 permits the adjacent gatherers 30a and 30b to overlap 36 along an imaginary axis that is substantially parallel to both the upper plane AA and the lower plane BB.

In the preferred embodiment, the fingers 32 of the adjacent chains 31a, 31b of adjacent row units 20a, 20b overlap as the chain 31a of row unit 20a is offset 34 from the adjacent chain 31b of row unit 20b. The overlap 36 permits the distance 35 between two adjacent row units 20a, 20b to be reduced by the amount of the overlap 36. Thus, the overlap 36 achieves a closer arrangement of the row units 20 so that the row crop header 15 has a crop row width 38 that is less than minimum crop row width achieved in existing corn heads.

In the preferred embodiment of the row crop header 15, the overlap 36 is approximately between 4 inches and 5 inches to permit the reduction of the crop row width 38 to less than 16 inches. In the preferred embodiment, the offset 34 is approximately 1.5 inches to allow the two adjacent gathering chains 31a, 31b to overlap 36 sufficiently to reduce the crop row width 38 of the row crop header 15. The offset 34 should also preferably be greater than the finger height 32b to ensure that the fingers of adjacent gathering chains, such as 31a and 31b, clear and do not interfere with each other during the operation of the row crop header 15.

The driven row unit 20 components, such as the gatherers 30 and the stalk rolls 40, are driven by a drive mechanism 65 shown schematically in FIG. 4. In the preferred embodiment, the drive mechanism 65 includes a power source 60 that drives a plurality of offset drive shaft segments 61a and 61b. The drive shaft segments 61a and 61b are offset to match the offset relationship of the adjacent row units, such as 20a and 20b. The adjacent drive shaft segments 61a and 61b are, preferably, connected to each other by universal joints 64.

Each drive shaft 61a, 61b has a gear box 62 with the power output of the gear boxes 62 connected to the gatherer shafts 63 that drive the sprockets 37 of the gatherers 30. The gear boxes 62 use gearing systems that are described in several U.S. Patents and any of them could be adapted for use with the row crop header of the present invention. For example, these include the drive means shown in U.S. Pat. No. 3,462,928 issued to L. D. Schreiner and in U.S. Pat. No. 3,599,409 issued to Martin J. Whitney, the disclosures of which are incorporated, in their entirety, by reference.

It is to be understood that the drive mechanism 65 is suitably installed within the row crop header and connected to the row unit components. The drive mechanism 65 is shown schematically in FIG. 4 as being separate for purposes of clarity.

In an alternative embodiment of the drive mechanism 65, a single drive shaft could be provided with gatherer shafts 63 of different lengths to drive the gatherers 30 positioned in the offset planes AA and BB, shown in FIG. 5. That is, longer gatherer shafts 63 would drive the gatherers 30 operating in the upper plane AA while shorter or standard gatherer shafts 63 would drive the gatherers 30 operating in the lower plane BB.

In another alternative embodiment of the drive mechanism 65, two drive shafts can be provided so that each drive shaft drives the row unit components of the row units 20 that are positioned in the same plane. Therefore, the driven components of row unit 20a would be driven by one of the two drive shafts. The driven components of row unit 20b, located in an offset plane from row unit 20a, would be driven by the other of the two drive shafts.

With reference to FIGS. 4 & 5, an improved method is also provided which includes providing a row crop header 15 including a first row unit 20a having at least one gatherer 30 positioned in an upper plane AA and a second row unit 20b having at least one gatherer 30 positioned in a lower plane BB. The first row unit 20a and the second row unit 20b are connected to a frame 17 of the row crop header 15 so that a primary gatherer 30a of the first row unit 20a overlaps a secondary gatherer 30b of the second row unit. The upper plane AA and the lower plane BB are substantially parallel to each other and spaced apart by an offset 34.

The method also provides for attaching the row crop header 15 to a harvesting machine 10, as shown in FIG. 1, and operating the row crop header 15 using a power source 60 to harvest row crops planted in narrower rows than in the past. In the preferred embodiment, the row crop header is discussed as operating on rows of corn, however, the improved row crop header 15 can also be adapted to work with other row crops such as cotton and sunflower.

Thus, the instant row crop header 15 permits a closer arrangement of the row units 20 to harvest crop rows that are 16 inches apart or less. Existing corn heads with the row units in substantially the same plane are unable to efficiently harvest rows that are narrower than 20 inches. Therefore, some of the major advantages of the instant row crop header include the unique combination of providing an improved apparatus and method that:

(i) permits the harvesting of narrower crop rows by allowing the row units to be arranged closer together on the row crop header frame;

(ii) benefits the environment by reducing the requirement for chemicals and pesticides per unit of crop harvested; and (iii) improves soil control and erosion by allowing crop rows to be planted closer together.

Other embodiments of the row crop header will be apparent to those skilled in the art from consideration of the specification disclosed herein. It is intended that the specification be considered as exemplary only, with the true scope and spirit of the invention being indicated by the following claims.

What is claimed is:

1. A row crop header for a harvesting machine comprising:
   a frame; and
   a plurality of substantially parallel row units mounted to the frame and extending in a row unit plane, the plurality of row units having a frame end and a head end and including a first row unit and a second row unit adjacent the first row unit, the first row unit including a first gatherer and a second gatherer, the first and second gatherers extending in a first plane parallel to the row unit plane, the second row unit including a third gatherer and a fourth gatherer, the third and fourth gatherers extending in a second plane parallel to the first plane, wherein the first and second planes are offset, and the second gatherer of the first row unit overlaps the third gatherer of the second row unit at the head end.

2. A row crop header according to claim 1 wherein the plurality of row units includes a plurality of fingers operatively connected to the gatherers,
   wherein the plurality of fingers have a finger height and a finger width, and
   wherein the offset is greater than the finger height.

3. A row crop header according to claim 2 wherein the second and third gatherers have an overlap along an axis substantially parallel to both the first and second planes.

4. A row crop header according to claim 3 wherein the second and third gatherers include a chain, each chain traversing a substantially oval path.

5. A row crop header according to claim 3 wherein the overlap is less than the finger width.

6. A row crop header according to claim 3 wherein the overlap is approximately between 4 inches and 5 inches.

7. A row crop header according to claim 2 wherein the gatherers include a chain operatively connected to the plurality of fingers.

8. A row crop header according to claim 1 wherein the offset is approximately 1.5 inches.

9. A row crop header according to claim 1 wherein the offset is adjustable.

10. A row crop header according to claim 1 wherein each of the plurality of row units further comprises:

a plurality of stalk rolls supported by each row unit; and a plurality of stripper plates cooperatively positioned within each row unit and proximate the plurality of stalk rolls to remove ears from corn stalks, wherein the gatherers operate to move the removed ears.

11. A row crop header according to claim 10 wherein the plurality of stripper plates comprises two adjustably spaced plates.

12. A row crop header according to claim 1 further comprising a power source including a gear box wherein a power output from the gear box drives the gatherers.

13. A harvesting machine comprising:

a vehicle; and a row crop header mounted to the vehicle, the row crop header having a frame and a plurality of substantially parallel row units mounted to the frame and extending in a row unit plane, the plurality of row units having a frame end and a head end and including a first row unit and a second row unit adjacent to the first row unit, the first row unit including a first gatherer and a second gatherer, the first and second gatherers extending in a first plane parallel to the row unit plane, the second row unit including a third gatherer and a fourth gatherer, the third and fourth gatherers extending in a second plane parallel to the first plane, wherein the first and second planes are offset and the second gatherer of the first row unit overlaps the third gatherer of the second row unit at the head end.

14. A method for harvesting row crops having narrower row widths comprising the steps of:

providing a row crop header having a frame end and a head end and including a first row unit extending in a row unit plane and an adjacent, substantially parallel second row unit extending in the row unit plane, the first row unit including a first gatherer and a second gatherer, the first and second gatherers extending in a first plane parallel to the row unit, the second row unit including a third gatherer and a fourth gatherer, the third and fourth gatherers extending in a second plane parallel to the first plane, wherein the first and second planes are offset; and connecting the first row unit and the second row unit to a frame of the row crop header so that at the head end the second gatherer of the first row unit overlaps the third gatherer of the second row unit along an axis that is substantially parallel to both the first and second planes.

15. A method for harvesting row crops according to claim 14, further comprising the steps of:

attaching the row crop header to a harvesting machine;

operating the row crop header with a power source; and harvesting the row crops with the row crop header attached to the harvesting machine.

* * * * *